(12) United States Patent
Worden et al.

(10) Patent No.: US 10,392,031 B2
(45) Date of Patent: Aug. 27, 2019

(54) SYSTEM AND METHOD FOR CONTROLLING A VEHICLE

(71) Applicant: General Electric Company, Schenectady, NY (US)

(72) Inventors: Bret Dwayne Worden, Erie, PA (US); Ajith Kuttannair Kumar, Erie, PA (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 36 days.

(21) Appl. No.: 15/342,774

(22) Filed: Nov. 3, 2016

(65) Prior Publication Data

US 2018/0118228 A1    May 3, 2018

(51) Int. Cl.
| | |
|---|---|
| *B60T 7/12* | (2006.01) |
| *B60T 8/17* | (2006.01) |
| *B61C 5/00* | (2006.01) |
| *B61H 9/00* | (2006.01) |
| *B60T 13/66* | (2006.01) |
| *B60T 17/22* | (2006.01) |
| *B60T 8/171* | (2006.01) |
| *B61C 15/12* | (2006.01) |

(52) U.S. Cl.
CPC ............. *B61C 15/12* (2013.01); *B60T 7/12* (2013.01); *B60T 8/171* (2013.01); *B60T 8/1705* (2013.01); *B60T 13/665* (2013.01); *B60T 17/228* (2013.01); *B61C 5/00* (2013.01); *B61H 9/006* (2013.01); *B60T 2201/03* (2013.01)

(58) Field of Classification Search
CPC . B61C 15/12; B61C 3/00; B60T 8/171; B60T 8/1705; B60T 2201/03; B60T 13/665; B60T 17/228; B60T 7/12; B61H 9/006
See application file for complete search history.

(56) References Cited

U.S. PATENT DOCUMENTS

| | | | | |
|---|---|---|---|---|
| 5,340,202 | A * | 8/1994 | Day | B60L 3/02 303/19 |
| 5,394,137 | A * | 2/1995 | Orschek | B60T 17/221 188/1.11 E |
| 6,943,675 | B2 * | 9/2005 | Petersen | B60T 17/228 188/162 |
| 8,924,117 | B2 * | 12/2014 | Kull | B60T 7/18 701/70 |
| 9,026,281 | B2 * | 5/2015 | Murphy | B60T 17/221 188/3 R |
| 9,150,208 | B2 * | 10/2015 | Schemmel | B60T 17/18 |

(Continued)

*Primary Examiner* — Jeffrey C Boomer
(74) *Attorney, Agent, or Firm* — Christopher R. Carroll; The Small Patent Law Group LLC

(57) ABSTRACT

A system includes a drive system having one or more traction motors coupled in driving relationship to a plurality of wheels of a vehicle system. The traction motors are configured to provide both motive power for the vehicle system in a propel mode of operation and retarding effort to brake the vehicle system in a braking mode of operation. The system further includes a parking brake for maintaining a static position of the vehicle system when in an engaged state, and a controller configured to detect when the parking brake is in the engaged state. The controller is further configured to control at least one of the one or more traction motors to provide a braking effort to resist movement of the vehicle system when the parking brake is in the engaged state.

20 Claims, 4 Drawing Sheets

(56) References Cited

U.S. PATENT DOCUMENTS

| | | | |
|---|---|---|---|
| 9,663,092 B2* | 5/2017 | Martin | B60T 17/228 |
| 9,845,084 B2* | 12/2017 | Kumar | B60T 8/1705 |
| 2003/0058091 A1* | 3/2003 | Petersen | B60T 17/228 |
| | | | 340/457.3 |
| 2009/0198406 A1* | 8/2009 | Brown | B60T 17/221 |
| | | | 701/29.1 |
| 2010/0070116 A1 | 3/2010 | Kumar et al. | |
| 2010/0235022 A1* | 9/2010 | Siddappa | B61C 17/12 |
| | | | 701/20 |
| 2011/0082631 A1* | 4/2011 | Busack | B60T 7/042 |
| | | | 701/70 |
| 2013/0066532 A1* | 3/2013 | Brown | B60T 17/221 |
| | | | 701/70 |
| 2013/0103267 A1* | 4/2013 | DeWitt | B60T 1/10 |
| | | | 701/50 |
| 2013/0190959 A1* | 7/2013 | Hammer | G01M 17/007 |
| | | | 701/22 |
| 2014/0032023 A1* | 1/2014 | Kumar | B60T 17/228 |
| | | | 701/20 |
| 2014/0088801 A1* | 3/2014 | Bartonek | G01M 17/08 |
| | | | 701/19 |
| 2014/0097667 A1* | 4/2014 | Backes, III | B60T 7/16 |
| | | | 303/20 |
| 2016/0144840 A1* | 5/2016 | Pfeifer | B60T 7/042 |
| | | | 701/76 |
| 2017/0334414 A1* | 11/2017 | Kumar | B60T 8/1705 |

* cited by examiner

SYSTEM AND METHOD FOR CONTROLLING A VEHICLE

FIELD OF THE INVENTION

Embodiments of the invention relate generally to vehicles. Certain embodiments relate to systems and methods for controlling a vehicle.

BACKGROUND OF THE INVENTION

A vehicle "consist" is group of two or more vehicles mechanically coupled or linked together to travel along a route. For example, a rail vehicle consist is a group of two or more rail vehicles that are mechanically coupled or linked together to travel along a route, as defined by a set of rails that support and guide the rail vehicle consist. One type of rail vehicle consist is a train, which may include one or more locomotives (or other powered rail cars/vehicles) and one or more non-powered rail cars/vehicles. (In the context of a rail vehicle consist, "powered" means capable of self propulsion and "non-powered" means incapable of self propulsion.) Each locomotive includes traction equipment for moving the train, whereas each rail car is configured for hauling passengers or freight.

Typically, when locomotives and/or rail cars are taken out of the consist and parked at a siding or yard, hand brakes or parking brakes on at least some of the cars are applied as a precaution against unwanted or unexpected movement of the cars. A typical hand brake may consist of an apparatus for manually applying a brake shoe or shoes to one or more wheels of the locomotive or rail car by turning a handwheel or pumping a handle connected by gears and/or linkages to the brake shoe engaging mechanism, and a mechanism for releasing the hand brake and causing the brake shoe or shoes to be disengaged from contact with the wheels.

Yard operations frequently involve the coupling and decoupling of rail vehicles to and from one another, and moving of the vehicles around the yard. Occasionally, however, the yard crew may couple a locomotive with an operator to another locomotive or rail vehicle, and move the consist without releasing all of the parking brakes in the consist. When this occurs one or more of several problems can result. Among them are worn brake shoes and wheel treads, cracked or broken wheels from overheating, and damaged rails.

In view of the above, there is a need for a system and method for preventing vehicle movement while parking and/or service brakes are engaged.

BRIEF DESCRIPTION OF THE INVENTION

In an embodiment, a system includes a drive system having one or more traction motors coupled in driving relationship to a plurality of wheels of a vehicle system. The traction motors are configured to provide both motive power for the vehicle system in a propel mode of operation and retarding effort to brake the vehicle system in a braking mode of operation. The system further includes a parking brake for maintaining a static position of the vehicle system when in an engaged state, and a controller configured to detect when the parking brake is in the engaged state. The controller is further configured to control at least one of the one or more traction motors to provide a braking effort to resist movement of the vehicle system when the parking brake is in the engaged state.

In an embodiment, a vehicle system includes a drive system with a traction motor connected in driving relationship to one or more wheels of the vehicle system. The motor is configured to provide both motive power to propel the vehicle system in a propel mode of operation and retarding effort to brake the vehicle system in a braking mode of operation. The vehicle system further includes a parking brake engageable with at least one of the wheels, and a controller communicatively coupled to the drive system and the parking brake. The controller is configured to determine if the parking brake is engaged, and to control the traction motor to provide a braking effort to resist movement of the vehicle system if the parking brake is engaged.

In an embodiment, a method includes determining, with a controller, if a parking brake of a vehicle system is engaged, and sensing, with the controller and/or a sensor communicatively coupled to the controller, a movement condition of the vehicle system. (The vehicle system may be, for example, a single vehicle, or it may include a consist of plural vehicles.) The method further includes controlling, with the controller, at least one traction motor of the vehicle system to apply a braking effort to at least one wheel of the vehicle system to resist motion of the vehicle system responsive to the movement condition being sensed while the parking brake is engaged.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
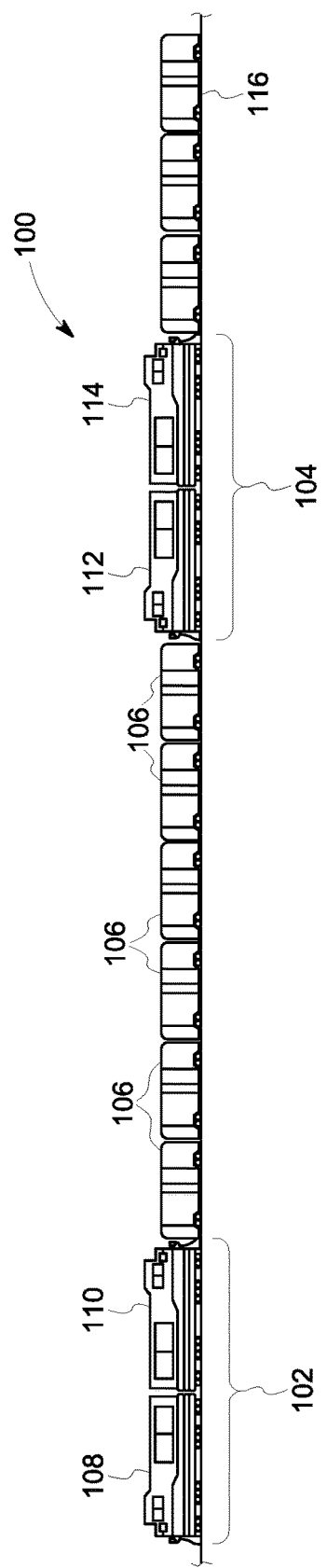
FIG. 1 is a schematic view of a vehicle consist, on which the system of the present invention may be deployed.

Reference will be made below in detail to exemplary embodiments of the invention, examples of which are illustrated in the accompanying drawings. Wherever possible, the same reference characters used throughout the drawings refer to the same or like parts. While exemplary embodiments of the invention are described with respect to rail vehicles, specifically trains and locomotives having diesel-electric propulsion systems, exemplary embodiments of the invention may also be applicable for other powered systems including vehicles and machinery, more generally. Other suitable vehicles include, for example, off-highway vehicles, automobiles, tractor-trailers and other on-road vehicles, transport vehicles, such as transport buses, and mining vehicles. As used herein, "electrical communication" or "electrically coupled" means that certain components are configured to communicate with one another through direct or indirect signaling by way of direct or indirect electrical connections. As used herein, "mechanically coupled" refers to any coupling method capable of supporting the necessary forces for transmitting torque between components. As used herein, "operatively coupled" refers to a connection, which may be direct or indirect. The connection is not necessarily being a mechanical attachment. As used herein, "communication" means that two or more components are connected in such a manner to allow for the propagation of signals between such components, such as, but not limited to, through wires/cables, fiber optics, and wireless transmitters/receivers.

Embodiments of the invention relate to systems and methods for controlling a vehicle or vehicle system, e.g., a rail vehicle in a train or other rail vehicle consist, to prevent vehicle movement when a parking brake of the vehicle is deployed. (The term 'vehicle system' encompasses single vehicles and also consists (groups) of vehicles.) In one embodiment, a system for preventing vehicle system movement when a parking brake is engaged includes a drive system having one or more traction motors coupled in driving relationship to a plurality of wheels of a vehicle system. The traction motor(s) are configured to provide both motive power for the vehicle system in a propel mode of operation and retarding effort to brake the vehicle system in a braking mode of operation. The system further includes a parking brake and a controller. The parking brake is configured for maintaining a static position of the vehicle system when in an engaged state. The controller is configured to detect when the parking brake is in the engaged state, and to control at least one of the traction motor(s) to provide a braking effort to resist movement of the vehicle system when the parking brake is in the engaged state.

FIG. 1 illustrates an exemplary rail vehicle consist on which the system may be deployed. The vehicle consist 100 may include various powered rail vehicles and non-powered rail vehicles. The powered rail vehicles may be locomotives, and for illustration purposes, the powered rail vehicles will be referred to as such in the following description. It should be noted, however, that where a locomotive is referred to, the description is applicable to powered rail vehicles and other vehicles more generally.

As illustrated in FIG. 1, the rail vehicle consist 100 may include a lead locomotive consist 102, a remote locomotive consist 104, and plural non-powered rail vehicles (e.g., freight cars or passenger cars) 106 positioned between the two consists 102, 104. The lead locomotive consist 102 may include one or more locomotives such as a lead locomotive 108 and a trail locomotive 110 adjacent to the lead locomotive. The remote locomotive consist 104 may also include one or more locomotives such as a lead remote locomotive 112 and a trail remote locomotive 114, which is adjacent to the lead remote locomotive 114. Other configurations are possible. All the vehicles of the consist 102 are sequentially mechanically connected together or otherwise linked for traveling along a rail track or other guideway 116.

Figure 2:
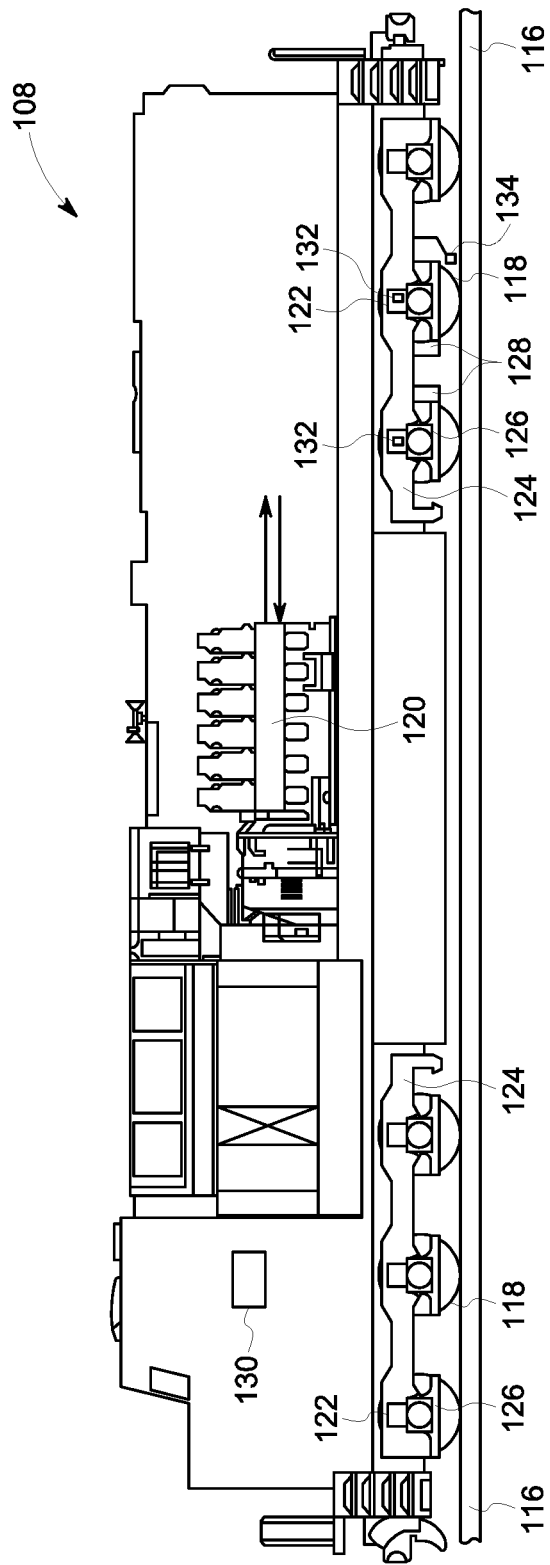
FIG. 2 is a schematic illustration of a vehicle of the consist of FIG. 1.

Turning now to FIG. 2, a schematic illustration of a locomotive, such as locomotive 108 of the consist 100 is illustrated. As indicated hereinbefore, the locomotive 108 is configured to run on rail(s) 116 via a plurality of wheels 118. As depicted, the locomotive 108 includes an engine 120, such as an internal combustion engine. A plurality of traction motors 122 are mounted on a truck frame 124, and are each connected to one of a plurality of wheels or wheel sets 118 (e.g., two wheels connected to an axle) to provide tractive power to propel and retard the motion of the locomotive 108, as discussed hereinafter. A journal box (journal bearing housing) 126 may be coupled to truck frame 124 at one or more of the wheels 118. The traction motors 122 may receive electrical power from an alternator/generator or electrical power converters (e.g., powered by the engine) to provide tractive power to the locomotive 108. As also illustrated in FIG. 2, the locomotive 108 may include a parking brake 128 associated with one or more of the wheels 118 for preventing or inhibiting movement of the locomotive 108 when engaged.

As used herein, the term "parking brake" may be any type of mechanical brake known in the art that selectively engages a rotating or moving component of (or associated with) a wheel of the vehicle to slow or stop the rotation of the wheel (e.g., by friction or other mechanical force) in order to hold the vehicle in static position. For example, a parking brake may utilize a wear surface that contacts (e.g., by clamping or pressing against) a rotating or moving component of a wheel of the vehicle to slow or stop the rotation of the wheel by friction. Forcing of the wear surface of the frictional brake against a portion of the wheel (e.g., a disc, drum, etc.) may be accomplished mechanically, hydraulically, pneumatically or electromagnetically. As used here, "parking brake" is intended to include not only the conventional hand brakes which are usually applied and released manually by a member of the train crew (or other operator) but also brakes which can be applied or released from a remote or central control point such as the locomotive or caboose and which may utilize vacuum, air pressure, electricity or other source of power to activate or release a brake on a standing railway car in a yard or siding, or other vehicle. Such hand brakes or parking brakes may include portions of the service brake system. As used herein, the term "service brakes" is intended to refer to air brakes usually on a train and controlled from a central location, usually the locomotive of a train, to retard the movement of a train or group of cars connected to a locomotive. In certain embodiments, "parking brake" means any system or device configured to hold a vehicle in static or stationary position, and may include, but is not limited to, a designated parking brake, the service brakes of a vehicle, the transmission of the vehicle, or the like. In certain embodiments, "parking brake" refers to a brake/brake system on a vehicle, which is in addition to the brake/brake system used for slowing or stopping a vehicle during movement of the vehicle for travel along a route, and which is designated for use for keeping the vehicle, once stopped, from movement when the vehicle is parked.

With further reference to FIG. 2, in an embodiment, each of the locomotives, such as locomotive 108, includes a controller or control unit 130 (having one or more processors) electrically coupled or otherwise in communication with the drive system thereof to control the traction motors 122 to propel the vehicle in a propel mode of operation, and to brake the vehicle in a dynamic braking mode of operation, in response to various operator inputs such as throttle or notch settings, braking commands, and the like. In particular, the traction motors 122 provide the tractive power to move the vehicle, and may be AC or DC electric motors. During a propel mode of operation, power may be transferred from the engine 120 to the traction motors 122, and thus to the wheels 118 of the locomotive 108 to effect movement. For example, an output shaft of the engine may run an alternator for generating AC electricity, which is converted to DC and then modulated (via one or more inverters) for powering the AC or DC traction motor(s).

In addition to providing motive power, the traction motors 122 also provide a braking force or braking effort for stopping or for slowing the speed of the locomotive 108. This is commonly referred to as dynamic braking. During a dynamic braking mode of operation, such as when motion of the locomotive 108 is to be retarded, power may be generated by the mechanical rotation of the drive wheels and directed toward a retarding grid (not shown). In particular, the kinetic energy of the locomotive 108 may be converted into rotational power at the drive wheels 118. Rotation of the drive wheels 118 may further rotate the motors 122 so as to generate electrical power, for example, in the form of AC power. The inverters (not shown) of the drive system may serve as a bridge to convert the power supplied by the motors 122 into DC power. Dissipation of the DC power generated by the motors 122 may produce a counter-rotational torque at the drive wheels 118 to decelerate the locomotive 108. Such dissipation may be accomplished by passing the generated current provided by the inverters through a resistance, such as a dynamic braking grid or retarding grid.

In addition to controlling the traction motors 122 to both propel and retard the locomotive 108 during operation, in an embodiment, the controller 130 of each locomotive is further configured to control one or more of the traction motors 122 to provide dynamic braking to oppose movement of the locomotive (when movement is attempted either under its own power or under power from another coupled or uncoupled locomotive or other vehicle) when the parking brake 128 is engaged. For example, in an embodiment, the controller 130 is configured to detect when the parking brake 128 on-board the locomotive is engaged, and, responsive thereto, to control one or more of the traction motors 122 to resist an attempted movement of the locomotive in order to prevent damage to the rail or wheels of the locomotive.

Figure 3:
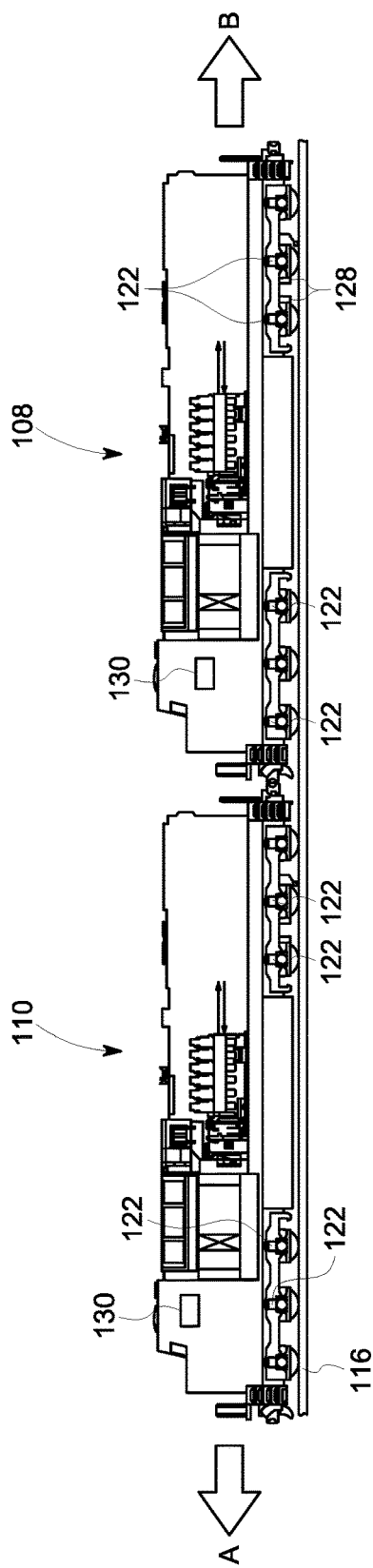
FIG. 3 is a schematic illustration of a vehicle control system, according to an embodiment.

For example, with reference to FIG. 3, in a rail yard, locomotive 108 may be held in place with its parking brake 128 engaged while not in use. Yard operations may thereafter require movement of the locomotive 108 for one location to another, such as for joining the locomotive 108 to a consist. This can be accomplished by disengaging the parking brake 128 on the locomotive 108, mechanically coupling another locomotive, such as locomotive 110, to locomotive 108, and applying a tractive effort to pull or push the locomotive 108 under power from the locomotive 110. As illustrated, for example, locomotive 110 may exert a biasing force or tractive effort on locomotive 108 in the direction of arrow A. Occasionally, however, the yard crew may attempt to move a locomotive before disengaging the parking brake, which can result damage to wheels, the rail, and brake shoes.

The system of the invention, however, is configured to detect such attempted movement and to control one or more of the traction motors 122 on the locomotive 108 to provide an equal and opposite braking effort, in the direction of arrow B, to prevent movement of the locomotive 108. In operation, the controller 130 on-board the locomotive 108 detects when the on-board parking brake 128 is engaged. This may be accomplished based on signals (electrical or pneumatic or otherwise) through the trainline, parking brake interlock, speed sensors coupled to parking brake axles, operator commands (such as throttle setting), and/or other sensors or control inputs. The controller 130 is also configured to detect a movement condition and, in response to such condition and based on detecting that the parking brake is engaged, to control the traction motor(s) 122 to oppose the movement of the locomotive 108. As used here, "movement condition" means movement of the locomotive or vehicle on which the parking brake 128 is engaged.

In an embodiment, the movement condition may be detected utilizing a speed sensor 132 associated with one or more of the traction motors 122 and in communication with the controller 130. Using the speed sensor 132, the controller 130 is configured to monitor the speed of rotation of the traction motor with which it is associated. As the traction motors 122 are coupled in driving relationship to the wheels 118 of the vehicle, a non-zero speed value received from the speed sensor 132 is indicative of traction motor rotation, and thus wheel rotation, indicating the movement condition vehicle motion. That is, by monitoring traction motor or wheel speed, motion of the locomotive may be detected. The movement condition may be detected in other ways, such as by GPS, video analytics, other sensor types and/or sensors associated with other vehicle components, etc.

As indicated above, if it is determined that the parking brake is engaged, and if motion of the locomotive is sensed (i.e., responsive to both conditions), the controller 130 may automatically control one or more of the traction motors 122 to apply a braking effort to arrest movement of the locomotive, e.g., an equal and opposite supplemental braking effort to arrest movement of the locomotive. In particular, the braking effort is equal in magnitude (and opposite) to the magnitude of the tractive effort being applied to the locomotive in the attempt to move the locomotive. In an embodiment, the braking effort may be a variable braking effort. In an embodiment, all powered axles are utilized to apply the braking effort. In an embodiment, the braking effort may be applied for a predetermined period of time. In yet another embodiment, the braking effort may be applied for a predetermined distance of vehicle travel, after which time the supplemental braking effort may be discontinued. In certain embodiments, the braking force may be limited to values less than that required to maintain zero speed, but may still be adequate to discourage the operator from continued efforts to move the consist. In such a situation, the braking force may be sufficient to make the operator aware that the parking brake is engaged.

In embodiments, the vehicle control system is configured to operate on an individual or single vehicle basis. That is, responsive to engagement of a parking brake and detected movement of the single vehicle, one or more motors of the single vehicle only are controlled to resist the movement. This does not preclude plural connected vehicles each having a respective iteration of the vehicle control system operatively deployed thereon and each such control system separately but concurrently controlling its respective vehicle to resist detected movement when parking brakes are engaged. In other embodiments, the system may be configured so that if plural vehicles (with traction motors) are coupled together, plural motors across plural of the vehicles are controlled in coordination to resist movement when a parking brake is engaged and a movement condition (of one or more of the vehicles) is detected.

In an embodiment, the locomotive 108 may include a temperature sensor 134 configured to detect or monitor a temperature at one of a parking brake-wheel interface or a wheel-rail interface. The controller 130 may further be configured to monitor the temperature at the parking brake-wheel interface and/or wheel-rail interface, and to control the traction motors 122 to apply the braking effort only after a minimum threshold temperature is reached as a result of locomotive movement while the parking brake 128 is engaged. In another embodiment, the control unit 130 may utilize a thermal model to estimate the temperature of the parking brake-wheel interface, and to apply the braking effort using the traction motors only when an estimated temperature of the parking brake-wheel interface exceeds a threshold temperature. It is contemplated that the model may estimate the temperature using a plurality of parameters stored in memory and/or received from various vehicle sensors. The parameters may include, but are not limited to, brake type, brake material, brake clamping force, traction motor rotational speed, wheel speed, vehicle speed, and ambient temperature. Utilizing the estimated or actual temperature of the parking brake-wheel interface as a threshold parameter ensures that the additional braking effort is only applied to help hold the vehicle in position when a temperature that would likely cause damage to the parking brake shoes or wheel is present.

In addition to automatically controlling the traction motors to provide a dynamic braking effort to arrest vehicle movement when the parking brake is set and vehicle movement is detected, the controller 130 may be further configured to generate an alert aboard the subject vehicle and/or all the connected vehicles in the consist to alert an operator that the parking brake is still set. In an embodiment, the alert may be an audible alarm or visual indication that the parking brake on one of the locomotives in the consist is still engaged. In response to this indication, an operator on-board one or more of the vehicles may take corrective action, such as releasing the parking brake or halting movement of the consist.

In further embodiments, the system is configured such that an operator may manually override the automatic application of the dynamic braking effort when the parking brake is engaged and a movement condition is detected, such as through an operator interface. This may be desirable when sensor failure or inaccuracies are suspected or detected, which can lead to erroneous indications of parking brake engagement. In addition, the automatic application of the dynamic braking effort to arrest vehicle movement may be disabled by the system in situations where, for example, speed sensor failure or parking brake interlock failure is detected or suspected.

In addition to the above, application of the dynamic braking effort may be delayed until a slide occurs. Moreover, in certain embodiments, dynamic braking effort on parking brake axles may be utilized to promote a slide to verify that the parking brake is set/engaged. This is valuable for applications where the parking brake status is not known to the control system due to lack of a signal interface. For example, in an embodiment, the controller may be configured to apply a dynamic braking effort to parking brake axles once the vehicle is in motion. The control system will monitor axle or traction motor speed to detect the beginning of a wheel slide, which would imply that the parking brake is engaged. Furthermore, the system and method of the invention may be combined, in some embodiments, with antilock brakes of the vehicle to arrest slides.

Figure 4:
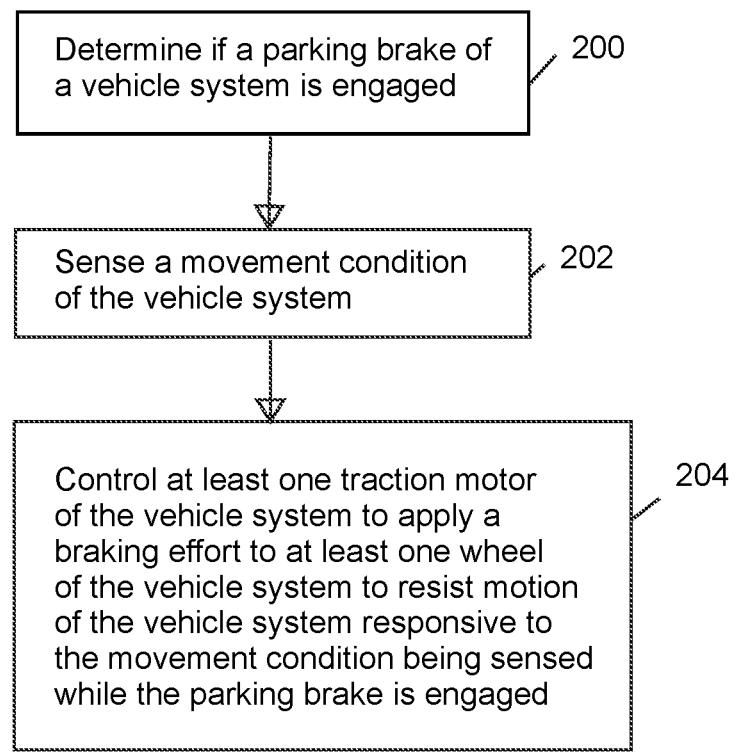
FIG. 4 is a flow chart of a method (e.g., vehicle control method), according to an embodiment.

In an embodiment, with reference to FIG. 4, a method (e.g., vehicle control method) includes determining 200, with a controller, if a parking brake of a vehicle system is engaged, and sensing 202, with the controller and/or a sensor communicatively coupled to the controller, a movement condition of the vehicle system. (The vehicle system may be, for example, a single vehicle, or it may include a consist of plural vehicles.) The method further includes controlling 204, with the controller, at least one traction motor of the vehicle system to apply a braking effort to at least one wheel of the vehicle system to resist motion of the vehicle system responsive to the movement condition being sensed while the parking brake is engaged.

The system and method of the invention therefore prevent or mitigate damage to both the vehicle and route surface (e.g., rail or road) which can occur when the parking brake is set and the vehicle is moved either under its own power or power from another vehicle, coupled or otherwise. In particular, the system and method of the invention utilize the traction motors of a vehicle with an active parking brake to amplify the authority of the parking brake, to effectively keep the vehicle from moving. This results in a braking force from the vehicle which is effectively large enough to oppose any motion in most cases where tractive effort is provided by other vehicles (e.g., locomotives coupled in a rail yard environment). The possibility of wheel-slide-related wheel or route damage as well as thermal damage to the wheels and brake shoes may therefore be reduced or eliminated.

In an embodiment, a system is provided. The system includes a drive system having one or more traction motors coupled in driving relationship to a plurality of wheels of a vehicle, the traction motor(s) being configured to provide both motive power for the vehicle in a propel mode of operation and retarding effort to brake the vehicle in a braking mode of operation, a parking brake for maintaining a static position of the vehicle when in an engaged state, and a controller configured to detect when the parking brake is in the engaged state, and to control at least one of the one or more traction motors to provide a braking effort to resist movement of the vehicle when the parking brake is in the engaged state. In an embodiment, the parking brake is a frictional brake having a wear surface configured to contact a rotating or moving component of at least one of the plurality of wheels. In an embodiment, the controller is configured to detect a movement condition of the vehicle, and to control the at least one traction motor to provide the braking effort when the movement condition is detected and the parking brake is in the engaged state. In an embodiment, the vehicle includes plural traction motors, and the controller is configured to control each of the traction motors of the vehicle to provide the braking effort. In an embodiment, the movement condition includes a tractive effort exerted on the vehicle in a first direction, and the braking effort is equal in magnitude to the tractive effort, and in a second direction that is opposite of the first direction. In an embodiment, the system may also include a speed sensor associated with the at least one traction motor and in communication with the controller, wherein the controller is configured to detect the movement condition of the vehicle using data received from the speed sensor. In an embodiment, the vehicle is a rail vehicle. In an embodiment, the system may also include a temperature sensor configured to detect a temperature at one of a parking brake-wheel interface or a wheel-rail interface. The controller may be configured to control the at least one traction motor to provide the braking effort when the detected temperature exceeds a threshold temperature. In an embodiment, the controller is configured to control the at least one traction motor to provide the braking effort for a predetermined period of time.

In an embodiment, a vehicle is provided. The vehicle includes a drive system including a traction motor connected in driving relationship to a wheel of the vehicle, the motor being configured to provide both motive power to propel the vehicle in a propel mode of operation and retarding effort to brake the vehicle in a braking mode of operation, a parking brake engageable with a wheel of the vehicle, and a controller communicatively coupled to the drive system and the parking brake. The controller is configured to determine if the parking brake is engaged, and to control the traction motor to provide a braking effort to resist movement of the vehicle if the parking brake is engaged. In an embodiment, the parking brake is a frictional brake having a wear surface configured to contact a rotating or moving component of a wheel of the vehicle. In an embodiment, the controller is configured to detect movement of the vehicle, and to control the at least one traction motor to provide the braking effort when movement is detected and the parking brake engaged.

In an embodiment, the traction motor is one of a plurality of traction motors associated with a plurality of wheels of the vehicle, and the controller is configured to control each of the traction motors of the vehicle to provide the braking effort. In an embodiment, movement of the vehicle occurs as a result of a tractive effort exerted on the vehicle in a first direction, and the braking effort applied by the controller through the traction motor is equal in magnitude to the tractive effort, and in a second direction that is opposite of the first direction. In an embodiment, the vehicle may include a speed sensor associated with the traction motor and in communication with the controller, the speed sensor being configured to monitor a rotational speed of the traction motor. The controller is configured to detect the movement of the vehicle through signals received from the speed sensor. In an embodiment, the vehicle may include a temperature sensor configured to detect a temperature at one of a parking brake-wheel interface or a wheel-rail interface. The controller may be configured to control the traction motor to provide the braking effort when the detected temperature exceeds a threshold temperature.

In an embodiment, a method includes the steps of determining if a parking brake of a vehicle is engaged, sensing a movement condition of the vehicle, and applying a supplemental braking effort to at least one wheel of the vehicle (parking brake axles) to resist motion of the vehicle. If the parking brake is engaged the additional braking force on the parking brake axles may promote a slide on that axle which can be detected by a speed sensor. In an embodiment, the method may also include the step of applying the supplemental braking effort includes controlling at least one traction motor connected in driving relationship to a wheel of the vehicle to oppose the motion of the vehicle. In an embodiment, the method may further include the step of determining an amount of tractive effort associated with the movement condition, and applying the braking effort at an amount equal to the amount of the tractive effort, and in a direction that is opposite the direction of the tractive effort. In an embodiment, applying the supplemental braking effort includes controlling all of the traction motors of the vehicle to oppose the motion of the vehicle.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
a drive system having one or more traction motors coupled in driving relationship to a plurality of wheels of a vehicle system, the one or more traction motors being configured to provide both motive power for the vehicle system in a propel mode of operation and retarding effort to brake the vehicle system in a braking mode of operation;
a parking brake for maintaining a static position of the vehicle system when in an engaged state; and
a controller configured to detect when the vehicle system is in the static position and the parking brake is in the engaged state, and to control at least one of the one or more traction motors to provide a braking effort to resist movement of the vehicle system when the parking brake is in the engaged state and the vehicle system is in the static position.

2. The system of claim 1, wherein:
the parking brake is a frictional brake having a wear surface configured to contact a rotating or moving component of at least one of the plurality of wheels.

3. The system of claim 1, wherein:
the controller is configured to detect a movement condition of the vehicle system, and to control the at least one of the one or more traction motors to provide the braking effort responsive to the movement condition being detected while the parking brake is in the engaged state.

4. The system of claim 3, wherein:
the one or more traction motors comprises plural traction motors, and the controller is configured to control each of the plural traction motors of the vehicle system to provide the braking effort.

5. The system of claim 3, wherein:
the movement condition includes a tractive effort exerted on the vehicle system in a first direction; and
the braking effort is applied in a second direction that is opposite of the first direction.

6. The system of claim 3, further comprising:
a speed sensor associated with the at least one of the one or more traction motors and in communication with the controller;
wherein the controller is configured to detect the movement condition of the vehicle system using data received from the speed sensor.

7. The system of claim 3, wherein:
the vehicle system comprises one or more rail vehicles.

8. The system of claim 3, further comprising:
a temperature sensor configured to detect a temperature at one of a parking brake-wheel interface or a wheel-rail interface;
wherein the controller is configured to control the at least one of the one or more traction motors to provide the braking effort when the temperature that is detected exceeds a threshold temperature.

9. The system of claim 1, wherein:
the controller is configured to control the at least one of the one or more traction motors to provide the braking effort for at least one of a predetermined amount of time or a predetermined distance of vehicle travel.

10. A vehicle system comprising:
a drive system including plural wheels and a traction motor connected in driving relationship to one or more of the plural wheels, the traction motor being configured to provide both motive power to propel the vehicle system in a propel mode of operation and retarding effort to brake the vehicle system in a braking mode of operation;
a parking brake engageable with the drive system; and
a controller communicatively coupled to the drive system and the parking brake, the controller being configured to determine if the vehicle system is in a static position with the parking brake engaged, and, responsive to detecting that the vehicle system is transitioning from the static position to a movement condition while the parking brake is engaged, the controller controls the traction motor to provide a braking effort to resist movement of the vehicle system.

11. The vehicle system of claim 10, wherein:
the parking brake is a frictional brake having a wear surface configured to
contact a rotating or moving component of the at least one of the wheels with which the parking brake is engageable.

12. The vehicle system of claim 10, wherein:
the controller is configured to detect movement of the vehicle system, and to control the traction motor to provide the braking effort responsive to when the movement is detected while the parking brake is engaged.

13. The vehicle system of claim 12, wherein:
the traction motor is one of a plurality of traction motors associated with a plurality of wheels of the vehicle system; and
the controller is configured to control each of the traction motors of the vehicle system to provide the braking effort.

14. The vehicle system of claim 12, wherein:
movement of the vehicle system occurs as a result of a tractive effort exerted on the vehicle system in a first direction; and
the braking effort applied by the controller through the traction motor is equal in magnitude to the tractive effort, and in a second direction that is opposite of the first direction.

15. The vehicle system of claim 12, further comprising:
a speed sensor associated with the traction motor and in communication with the controller, the speed sensor being configured to output signals indicative of a monitored rotational speed of the traction motor;
wherein the controller is configured to detect the movement of the vehicle system based on the signals received from the speed sensor.

16. The vehicle system of claim 15, further comprising:
a temperature sensor configured to detect a temperature at one of a parking brake-wheel interface or a wheel-rail interface;
wherein the controller is configured to control the traction motor to provide the braking effort when the temperature that is detected exceeds a threshold temperature.

17. A method comprising:
determining, with a controller, if a parking brake of a vehicle system is engaged when the vehicle system is in a static position;
sensing, with at least one of the controller or a sensor communicatively coupled to the controller, a movement condition of the vehicle system; and
controlling, with the controller, at least one traction motor of the vehicle system to apply a braking effort to at least one wheel of the vehicle system to resist motion of the vehicle system responsive to the movement condition being sensed while the parking brake is engaged and the vehicle system is in the static position.

18. The method of claim 17, further comprising:
determining an amount of tractive effort associated with the movement condition; and
adjusting the braking effort to an amount equal to the amount of the tractive effort, and in a direction that is opposite the direction of the tractive effort, to stop the vehicle system.

19. The method of claim 17, wherein:
the at least one traction motor comprises plural traction motors of the vehicle system; and
applying the braking effort includes controlling the plural traction motors of the vehicle system to oppose the motion of the vehicle system.

20. The method of claim 19, wherein:
the vehicle system comprises a consist of at least first and second vehicles, each of the first and second vehicles having at least one of the plural traction motors respectively operably coupled thereto for vehicle movement and braking; and
the braking effort is applied by controlling each of the at least one of the plural traction motors of the first and second vehicles.

* * * * *